(12) United States Patent
Damm

(10) Patent No.: US 10,574,499 B2
(45) Date of Patent: Feb. 25, 2020

(54) MULTICARRIER TRANSMISSION

(71) Applicant: Damm Cellular Systems A/S, Sønderborg (DK)

(72) Inventor: Hans Damm, Sydals (DK)

(73) Assignee: Damm Cellular Systems A/S, Sønderborg (DK)

(*) Notice: Subject to any disclaimer, the term of this patent is extended or adjusted under 35 U.S.C. 154(b) by 0 days.

(21) Appl. No.: 16/303,102

(22) PCT Filed: May 22, 2017

(86) PCT No.: PCT/EP2017/000616
§ 371 (c)(1),
(2) Date: Nov. 19, 2018

(87) PCT Pub. No.: WO2017/202492
PCT Pub. Date: Nov. 30, 2017

(65) Prior Publication Data
US 2019/0222458 A1     Jul. 18, 2019

Related U.S. Application Data

(60) Provisional application No. 62/342,464, filed on May 27, 2016.

(30) Foreign Application Priority Data

May 27, 2016 (EP) .................... 16001203

(51) Int. Cl.
*H04L 27/26* (2006.01)
*H04B 1/04* (2006.01)
*H04L 27/36* (2006.01)

(52) U.S. Cl.
CPC ....... *H04L 27/2649* (2013.01); *H04B 1/0475* (2013.01); *H04L 27/364* (2013.01);
(Continued)

(58) Field of Classification Search
CPC . H04L 27/2649; H04L 27/364; H04B 1/0475; H04B 2001/0441
See application file for complete search history.

(56) References Cited

U.S. PATENT DOCUMENTS

| | | | | |
|---|---|---|---|---|
| 4,933,986 A * | 6/1990 | Leitch | .................. | H03G 3/3042 332/162 |
| 2004/0043728 A1* | 3/2004 | Rozenblit | ................ | H04B 1/04 455/118 |

(Continued)

FOREIGN PATENT DOCUMENTS

WO     2017/202492 A1     11/2017

OTHER PUBLICATIONS

World Intellectual Property Organization, International Search Report and Written Opinion for International Application No. PCT/EP2017/000616, dated Sep. 1, 2017, 12 total pages.

*Primary Examiner* — Mohammad S Anwar
(74) *Attorney, Agent, or Firm* — SoCal IP Law Group LLP; Mark Andrew Goldstein

(57) ABSTRACT

A multicarrier-radio transmitter has a digital signal processor to produce a multicarrier signal at IF, and a transmit amplifier circuit to amplify and transmit the multicarrier signal at RF. A feedback loop of the transmit amplifier circuit has a subtractor, an I/Q demodulator in the forward path, a loop-filter system in the forward path at baseband, an I/Q modulator in the forward path, a power amplifier in the forward path, a pick-off node to pick off the multicarrier RF signal, and a down converter in the reverse path to down-convert the picked-off multicarrier RF signal to IF.

19 Claims, 7 Drawing Sheets

(52) U.S. Cl.
CPC ............... *H04B 2001/0425* (2013.01); *H04B 2001/0433* (2013.01); *H04B 2001/0441* (2013.01)

(56) References Cited

U.S. PATENT DOCUMENTS

| | | | |
|---|---|---|---|
| 2004/0100330 A1* | 5/2004 | Chandler | H03F 1/083 330/305 |
| 2010/0022206 A1 | 1/2010 | Aparin et al. | |

* cited by examiner

MULTICARRIER TRANSMISSION

RELATED APPLICATION INFORMATION

This patent claims priority from International PCT Patent Application No. PCT/EP2017/000616, filed May 22, 2017 entitled, "MULTICARRIER TRANSMISSION", which claims priority to European Patent Application No. 16 001 203.5, filed May 27, 2016 and U.S. Provisional Application No. 62/342,464, filed May 27, 2016, all of which are incorporated herein by reference in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

The invention relates to multicarrier transmission and, for example, to a multicarrier-radio transmitter, a method of generating amplified multicarrier-radio signals with a multicarrier-radio transmitter, and the use of a multicarrier-radio for generating amplified multicarrier-radio signals.

Relatively high linearity requirements, i.e. requirements as to frequency independence of the amplifier gain, are typically to be fulfilled by radio amplifiers that are used to transmit narrow-band radio signals, in particular radio signals with a time-varying envelope. It is known that radio-amplifier linearization can be achieved by a negative feedback of the radio frequency (RF) signal after the RF amplifier to the input of the amplifier circuit. An example is described by C. N. Wilson et al., "*A new generation Cartesian loop transmitter for flexible radio solutions*", EngineerIT, September 2006, p. 46-50. In the reverse path of the feedback loop the RF signal is down-converted to baseband. The RF signal has two independent and orthogonal signal components; i.e. signal components shifted relative to each other by 90° with reference to a high-frequency carrier, an In-phase component (I) and a Quadrature component (Q). The RF signal is down-converted in the reverse path to baseband by an I/Q demodulator enabling the I and Q components to be separated. A loop filter is provided at the baseband. As the I and Q components are orthogonal to each other, this type of feedback loop is referred to as a "Cartesian loop".

GB 2522700 A describes another type of RF amplifier with feedback to linearize the RF amplifier. The RF signal is fed back without any down-conversion in the reverse path. Down-conversion to baseband is performed by an I/Q demodulator in the forward path followed by a loop filter and an I/Q modulator to up-convert the signal again.

SUMMARY

A multicarrier-radio transmitter is provided that internally uses at least three frequency levels; baseband, an intermediate frequency, IF, and a radio frequency, RF. The multicarrier-radio transmitter comprises a digital signal processor to produce a multicarrier signal at the IF, and a transmit amplifier circuit to amplify and transmit the multicarrier signal at the RF. The transmit amplifier circuit forms a feedback loop with a forward path and a reverse path. The multicarrier signal at the IF is an input signal for the transmit amplifier circuit. The feedback loop comprises:
  a subtractor to receive the multicarrier IF input signal from the digital signal processor and a fed-back signal from the reverse path at the IF and to provide a feedback-corrected signal at the IF;
  an I/Q demodulator in the forward path to down-convert the feedback-corrected multicarrier signal from the IF to baseband;
  a loop-filter system in the forward path at baseband;
  an I/Q modulator in the forward path to up-convert the baseband multicarrier signal from baseband to the RF;
  a power amplifier in the forward path to amplify the RF signal to be transmitted via an antenna;
  a pick-off node to pick off the RF multicarrier signal after the power amplifier;
  a down converter in the reverse path to down-convert the picked-off RF multicarrier signal from the RF to the IF.

According to another aspect a method is provided of generating and amplifying multicarrier-radio signals with a multicarrier-radio transmitter that internally uses at least three frequency levels, baseband, an intermediate frequency, IF, and a radio frequency, RF. The multicarrier-radio transmitter comprises a feedback loop with a forward path and a reverse path. The method comprises:
  producing the multicarrier signal at the IF by a digital signal processor,
  receiving, at a subtractor, the multicarrier IF input signal and a fed-back IF signal from the reverse path to provide a feedback-corrected multicarrier signal at the IF;
  down-converting, in the forward path, the feedback-corrected multicarrier signal from the IF to baseband by an I/Q demodulator;
  filtering, in the forward path, the multicarrier signal at baseband by a loop-filter system;
  up-converting, in the forward path, the baseband multicarrier signal from baseband to the RF by an I/Q modulator;
  amplifying by a power amplifier, in the forward path, the RF signal to be transmitted via an antenna;
  picking off, by a pick-off node, the RF multicarrier signal after the power amplifier;
  down-converting the picked-off RF multicarrier signal from the RF down to the IF by a down converter in the reverse path.

Another aspect pertains to the use of a multicarrier-radio transmitter for generating amplified multicarrier-radio signals. The multicarrier-radio transmitter internally uses at least three frequency levels, baseband, an intermediate frequency, IF, and a radio frequency, RF. It comprises a digital signal processor to produce a multicarrier signal at the IF, and a transmit amplifier circuit to amplify and transmit the multicarrier signal at the RF. The transmit amplifier circuit forms a feedback loop with a forward path and a reverse path. The feedback loop comprises:
  a subtractor to receive the multicarrier IF input signal from the digital signal processor and a fed-back signal from the reverse path at the IF and to provide a feedback-corrected signal at the IF;

an I/Q demodulator in the forward path to down-convert the feedback-corrected multicarrier signal from the IF to baseband;

a loop-filter system in the forward path at baseband;

an I/Q modulator in the forward path to up-convert the baseband multicarrier signal from baseband to the RF;

a power amplifier in the forward path to amplify the RF signal to be transmitted via an antenna;

a pick-off node to pick off the RF multicarrier signal after the power amplifier;

a down converter in the reverse path to down-convert the picked-off RF multicarrier signal from the RF to the IF.

GENERAL DESCRIPTION OF EXAMPLE EMBODIMENTS

The radio transmitter described herein is able to produce, amplify, and transmit signals with an arbitrary spectrum extending over a frequency range that covers a plurality of frequency channels of a mobile radio communication system. It can therefore simultaneously produce, amplify, and transmit radio signals associated with different carrier frequencies of that mobile radio communication system. Due to this ability it is referred to as a "multicarrier-radio transmitter".

The inventor has found that feedback amplifier circuits with conventional Cartesian loops are good for linearizing radio amplifiers for transmitting narrow-band radio signals, in particular radio signals with a time-varying envelope, but that it is difficult to achieve the required linearity needed, e.g. for multicarrier transmission, in particular for radio signals with a time-varying envelope.

In this context, the inventor has recognized that any nonlinearity (i.e. frequency dependence of the transmission function), or signal distortion, introduced in the reverse path of the amplifier circuit's feedback is not suppressed by the negative feedback of the amplifier output, because the fed-back signal is a reference signal, and if the reference signal is distorted, the correction based on this reference signal (i.e. the negative feedback) will also have this distortion. Likewise, the inventor has also recognized that any signal distortion of the signal before entering the feedback circuit is not suppressed by the negative feedback, either, because distortions of that kind are not yet in the range of the correction based on the reference signal, i.e. the fed-back signal.

Based on these insights the inventor has recognized that, in order to provide a radio transmitter suitable for multiband transmission, the conventional Cartesian-loop arrangement with an I/Q demodulator placed in the reverse path of the feedback loop (such as in the article by Wilson et al.) or an arrangement with an I/Q modulator before the feedback loop, such as in GB 2522700 A, should be avoided, because such (de)modulators will tend to exhibit nonlinear behavior or produce other signal distortions.

The solution described herein avoids the presence of an I/Q modulator or demodulator, or any other circuit element causing significant nonlinearity or distortion, in the reverse path of the feedback loop, or before the feedback loop, while maintaining the loop filter, which is provided to ensure stability of the feedback circuit, at baseband, as in Wilson et al. and GB 2522700 A.

As will be described in more detail below, the radio transmitter described herein provides improved linearity and suppression of signal distortions, and therefore enables multicarrier signals to be transmitted. For example, when two frequency channels are simultaneously operated to provide a sufficient number off communication channels, this means conventionally that two transmitters and two antenna, etc. are needed. With the solution described herein, a single transmitter with a single antenna can instead perform the same task. For example, in TETRA a frequency channel is subdivided in four time slots, each time slot forming a sub-channel. One sub-channel is needed for control signals; so there are three communication channels in a TETRA communication system with one transmitter transmitting at a first carrier frequency in the base station. If more than three communication channels are simultaneously required, conventionally a second transmitter transmitting at another carrier frequency is provided at the base station. With the present multicarrier-radio transmitter, which can transmit the signals associated with both channel frequencies simultaneously, only a single transmitter (with a single antenna etc.) can perform the task.

In some embodiments, the multicarrier-radio transmitter internally uses at least three frequency levels, namely an intermediate frequency (also referred to as "IF") in addition to baseband and radio frequency (also referred to as "RF").

The introduction of the IF enables the I/Q demodulator of the conventional Cartesian loop to be removed from the reverse path of the feedback loop, without having to add an I/Q modulator before the feedback loop.

In some example embodiments the IF is in the range of 1 to 200 MHz, or 10 to 100 MHz, while the RF is, for example, at least a factor of 1.2 or more above the IF.

An I/Q modulator before the feedback loop can be dispensed because the multicarrier signal at the IF is directly produced digitally from digital information signals to be transmitted by a digital signal processor (also referred to as DSP for short), without any analog mixer. DSPs suitable to directly produce IF signals are commercially available, and causing the DSP to provide the multicarrier signal is a matter of storing and running suitable software on the DSP. By producing the IF signal digitally the IF signal is nearly free of distortions.

The subsequent transmit amplifier circuit amplifies and transmits the multicarrier signal at the RF. It is an analog circuit, which enables the signal associated with a plurality of carriers to be amplified and transmitted simultaneously (because generally an analog circuit "does not care" about the spectrum of the signal, and therefore does not care of whether the signal spectrum corresponds to a single frequency channel or a plurality of frequency channels; except for a frequency dependence of the transmission function). Generally, the IF signal produced by a CPU of the DSP is initially a digital signal, and is converted by a digital-to-analog converter (abbreviated DAC) of the DSP to form an analog multicarrier signal at the IF for the analog transmit amplifier circuit.

It is noted that the DAC is mentioned in conjunction with FIG. 7 as a part of the DSP. Some other features of peripheral nature are not explained and drawn, such as intermediate amplifiers and attenuators that provide the required signal levels, or filters that cut off unwanted components in the signal spectrum. For example, DACs and mixers of the I/Q (de-)modulator and the down converter, will typically produce harmonics at multiples of the DAC conversion frequency, and at unused sideband frequencies, respectively, that are far off the frequency of interest, and are filtered out.

The transmit amplifier circuit forms a feedback loop comprising a forward path and a reverse path, wherein the multicarrier signal at the IF is an input signal to the transmit amplifier circuit; i.e. the input to the feedback loop is at the IF level. It is noted that the terminology used in the literature is not uniform; often the reverse path is referred to as the "feedback loop". However, in the present description the entire loop comprising both the forward and the reverse paths is designated "feedback loop". The feedback loop reduces any distortion to which the multicarrier signal is subjected in the forward path, and thereby also provides amplifier linearization, by negative feedback from the output of the radio amplifier circuit.

The feedback loop comprises a subtractor to receive the multicarrier IF input signal from the digital signal processor and a fed-back multicarrier signal from the reverse path at the IF. The subtractor provides a feedback-corrected multicarrier signal at the IF by subtracting the fed-back multicarrier IF signal from the multicarrier IF input signal. By subtracting a representation of the actually transmitted signal (i.e. the fed-back multicarrier signal) from the input signal, which is the desired signal, the gain of the transmit amplifier circuit is, for example, relatively low where the actual signal corresponds to the desired signal, and is relatively high where the actual signal is lowered, e.g. due to nonlinearity of the power amplifier, thereby effectively linearizing the transmit amplifier circuit. "Subtractor" is to be understood in a functional sense; for example, it may also be implemented as a summer preceded by an inverter in the feedback path.

As already mentioned above, a loop filter is provided to ensure stability of the feedback loop. Assuming for simplicity that the signal delay in the loop is frequency independent the phase shift to which signals through the loop are subjected grows with frequency. Therefore, higher frequencies amplified with a gain>1 may cause instability of the feedback loop. Therefore, for example, the loop filter is a low-pass filter arranged to ensure that the loop gain is below unity when the phase shift approaches 180°.

For example, the loop-filer system has a loop filter, e.g. a low-pass filter, for the I component and another loop filter, e.g. a low-pass filter, for the Q component.

As the loop-filter systems operates at baseband while the subtractor operates at the IF an I/Q demodulator is provided in the forward path of the feedback loop between the subtractor and the loop-filer system to down-convert the feedback-corrected multicarrier signal from the IF to baseband.

The spectrum of the multicarrier IF signal below and above the IF can be considered to be a lower sideband (LSB) and an upper sideband (USB) of the IF signal, respectively, and the equivalent baseband signal has negative and positive frequencies, represented by a complex-valued signal with the I component (in-phase component, or real part) and the Q component (=quadrature component, or imaginary part) of the signal at baseband.

Following the loop-filter system the baseband signal with its I and Q components is up-converted to the RF by an I/Q modulator. The I and Q components are modulated into the RF signal in an orthogonal manner by a modulation with 90°-phase shift (relative to the RF). Thereby the original multicarrier signal is re-established, now shifted, i.e. up-converted, from IF to RF. It is noted that the I/Q modulator up-converts the entire multicarrier signal with all the carrier signals jointly with a single local-oscillation frequency; this is basically different from other technologies in which there would separate modulators for each carrier signal operating in parallel, and the separately modulated carrier signal would then be combined and amplified after the combiner.

In the embodiments described the multicarrier RF signal is then amplified by an RF power amplifier in the forward path and, for example, output to an antenna connector, so as to be transmitted via an antenna. As typical for power amplifiers, the power amplifier will generally exhibit unwanted distortions, such as non-linearity in amplitude and/or frequency. The feedback loop effectively reduces any such unwanted distortions by causing, for example, those components of the signal that are only amplified with a lower gain due to a distortion by the amplifier to be less attenuated by the subtractor than the undistorted signal components, thereby compensating the signal distortion introduced by the power amplifier.

In order to feed back a part of the multicarrier RF signal a pick-off node is provided following the power amplifier where the power-amplified multicarrier RF signal is picked off. The picked-off multicarrier RF signal is fed into the reverse path of the feedback loop; hence the pick-off node is the starting point of the reverse path. The pick-off may be implemented in various ways, for example inductively (e.g. by a coil inductively coupled to the RF line from the power amplifier to the antenna, or antenna connector), or by a signal splitter at this RF line, etc.).

To adapt the frequency of the picked-off RF signal to the subtractor at the IF, where it is combined with the multicarrier IF input signal from the DSP, a down converter is provided in the reverse path of the feedback loop. It converts the obtained multicarrier RF signal from the RF to the IF. The spectral components below and above the RF are not decomposed into its I and Q components, as it would be the case in I/Q demodulation to baseband. The down converter only shifts the frequency from RF to IF. A down converter of this sort does not produce certain artifacts typical for an I/Q demodulator.

The down-converted multicarrier IF signal is the fed back to the subtractor and forms the subtractor's input signal to be subtracted from the subtractor's other input signal, the output from the DSP. To adapt the order of magnitude of the fed-back signal to the subtractor's other input signal the fed-back signal may be attenuated, either indirectly by attenuating characteristics of the pick-off node, or directly by an attenuator before or after the down converter in the reverse path. The fed-back input to the subtractor is the end of the reverse path of the feedback loop. By this negative feedback, i.e. by subtracting a representation of the actually transmitted signal (i.e. the fed-back multicarrier IF signal) from the desired signal (=the multicarrier IF input signal from the DSP) the gain of the transmit amplifier circuit is, for example, relatively low where the actual signal corresponds to the desired signal, and is relatively high where the actual signal is lowered, e.g. due to non-linearity of the power amplifier. This compensates, to a large extent, any nonlinearity of the power amplifier and any other signal distortions introduced in the forward path of the feedback loop (e.g. by the I/Q demodulator and the I/Q modulator) and thereby effectively linearizes and improves the signal quality of the transmit amplifier circuit.

The I/Q modulator and the I/Q demodulator comprise a mixer that combines the multicarrier signal to be up-converted, or down-converted, with a periodic oscillation signal produced by a local oscillator in a nonlinear manner, referred to as "local-oscillation signal" (note that a local-oscillator signal input into mixer is often referred to as a "carrier signal"; however, in the present context the designation "local-oscillation signal" is preferred to avoid confusion with the carriers in the "multicarrier signal" produced by the DSP).

In some embodiments the I/Q modulator and the I/Q demodulator are arranged to perform the up-conversion and down-conversion with suppression of the local-oscillation signal, meaning that although the local-oscillation signal is fed into the mixer it does ideally not appear in the mixer output. For example, by using a multiplicative mixer the mixer will only produce sums and differences of the signal to be up- or down-converted and the local-oscillation signal, but will not produce any term with the frequency of the local-oscillation signal itself, provided that there is no constant component of the signal to be up- or down-converted. Moreover, any unwanted "feedthrough" of the local-oscillation signal is further suppressed by the feedback, as no such oscillation frequency is contained in the initial multicarrier signal produced by the DSP; the feedthrough is rather an artifact produced by I/Q (de-)modulators in the forward path of the feedback loop.

In some embodiments, at least three local-oscillation signals with different frequencies are produced by local oscillators for the I/Q modulator and the I/Q demodulator in the forward path and the down converter in the reverse path. The three frequencies are related to one another and to the IF and RF as follows: the local-oscillation signal for the I/Q demodulator has a frequency at the IF; the local-oscillation signal for the I/Q modulator has a frequency at the RF; and the local-oscillation signal for the down converter has a frequency corresponding to the sum or the difference of the frequency of the local-oscillation signal for the I/Q modulator and the frequency of the local-oscillation signal for the I/Q demodulator.

For example, if the frequency of the local-oscillation signal for the down converter is chosen to be the sum of RF and IF, by using the difference signal between the local-oscillation signal and the fed-back multicarrier RF signal produced by the down converter's mixer, a version of the multicarrier signal down-converted to IF is obtained, which is input to the subtractor.

Accordingly, in some embodiments the multicarrier-radio transmitter comprises local oscillators to produce the local-oscillation signals, and a local-oscillator network connecting the local oscillators. Since the total effect of the stepwise down-conversion from RF to IF and from IF to baseband should be complementary to that of the single-step up-conversion from baseband to RF, the local-oscillator frequency may be aligned correspondingly. For example, in some embodiments at least one of the local oscillators is frequency and phase controlled relative to the other local oscillator, or oscillators, to ensure that a sum or difference of the frequencies of the local-oscillation signal for the down converter and the local-oscillation signal for the I/Q demodulator equals the frequency of the local-oscillation signal for the I/Q modulator.

In some of these embodiments a difference signal of the local oscillation signal for the down converter and the local oscillation signal for the I/Q demodulator is produced. The frequency- and phase-control for the at least one frequency- and phase-controlled local oscillator in some of these embodiments also ensures that the phase of the difference signal of the local oscillation signal for the down converter and the local oscillation signal for the I/Q demodulator relative to the phase of the local oscillation signal for the I/Q modulator is constant.

Alternatively a sum signal of the local oscillation signal for the down converter and the local oscillation signal for the I/Q demodulator may be produced, and the frequency- and phase-control for the at least one frequency- and phase-controlled local oscillator may ensure that the phase of the sum signal of the local oscillation signal for the down converter and the local oscillation signal for the I/Q demodulator relative to the phase of the local oscillation signal for the I/Q modulator is constant.

In some embodiments the multicarrier-radio transmitter comprises three local oscillators to produce the three local-oscillation signals mentioned (for the I/Q modulator and the I/Q demodulator in the forward path, and for the down converter in the reverse path). Two of the three local oscillators are free-running oscillators, and the third one is frequency- and phase-controlled relative to the two free-running local oscillators to ensure that the sum or difference of the frequencies of the local-oscillation signal for the down converter and the local-oscillation signal for the I/Q demodulator equals the frequency of the local-oscillation signal for the I/Q modulator.

In some of these embodiments the third local oscillator, e.g. the local oscillator associated with the down-converter at the IF in the reverse loop, is frequency- and phase-controlled by an output signal of a phase-locked loop (PLL). The phase-locked loop receives a signal representative of the local-oscillation signal of one of the two free-running local oscillators, e.g. of the local oscillator associated with the I/Q demodulator as a control-input signal.

Different from a usual phase-locked loop, the feedback-signal of the phase-locked loop described herein is a frequency-converted combination of the local-oscillation signal of the other of the two local oscillators, e.g. of the local oscillator associated with the I/Q modulator, and the local-oscillation signal of the frequency- and phase-controlled oscillator. The frequency-converted combination of the PLL feedback signal can be obtained, for example, by mixing the local-oscillation signal of the other of the two local oscillators, e.g. of the local oscillator associated with the I/Q modulator, and the local-oscillation signal of the frequency- and phase-controlled oscillator by means of an oscillation-signal mixer. As a result of this mixing process a PLL feedback signal is obtained at the IF frequency that can be compared with the control-input signal to the PLL from the one of the two free-running local oscillators, e.g. of the local oscillator associated with the I/Q demodulator. On the basis of any deviation in the frequency and/or phase between the control-input signal and the special PLL feedback signal, as described, the phase-locked loop produces a control signal for the frequency- and phase-controlled oscillator. If the frequencies of the control-input signal and the PLL feedback signal are not the same, the control signal will increase (or decrease) in time, and if the frequencies of the control-input signal and the PLL feedback signal are the same, but phase shifted by a value constant in time the control signal will take a constant value representative of the phase shift. In response to this control signal the frequency- and phase-controlled oscillator adjusts the frequency and phase of the local-oscillation signal produced by it so that the frequency and the relative phase shift of the two inputs to the phase-locked loop become identical and zero, respectively.

In some embodiments, the multicarrier-radio transmitter may further comprise a phase adjuster to adjust a local-oscillation-signal phase. The phase adjuster may be, for example, arranged in the local-oscillator network to adjust the relative phase of one or more of the local-oscillation signals so as to compensate signal-propagation delays in the feedback loop at the level of the IF. Therefore, as the IF is a periodic carrier signal, any loop delay resulting in a phase shift of multiples by the period of the IF will not be visible, and will therefore not produce any instability of the feedback loop. With the phase adjuster the phase shift of the fed-back IF signal is adjusted such that the region of instability (at around 180° phase shift in the IF signal) is avoided. In some embodiments with a phase-locked loop to control the frequency and phase of the local oscillator for the down-converter in the reverse path, the phase adjuster allows to shift the relative phase of the inputs to the phase-locked loop. For example, the phase adjuster can be inserted between the local oscillator for the I/Q demodulator and the phase-locked loop to control the local oscillator for the down-converter in the reverse path.

The phase delay of the feedback loop the feedback loop of the transmit amplifier circuit, and thereby the additional phase delay to be introduced by the phase adjuster, is generally frequency dependent. In some embodiments the multicarrier-radio-transmitter circuit is designed to operate only in a fixed frequency regime; this obviates a need to change the phase adjuster during operation and enables the phase adjuster to be adjusted only once in factory, when the multicarrier-radio-transmitter circuit is produced. In other embodiments the phase adjuster is automatically adjusted to a predetermined value, e.g. upon start-up of the multicarrier transmitter circuit at a given operating frequency, or a change of operation to a given operating frequency. In still other embodiment a suitable phase adjustment is experimentally found during operation, or in training phases, by an optimization procedure in which the phase delay produced by the phase adjuster is actively varied, and the response of a stability-indicative parameter in the feedback loop is evaluated, such as the signal amplitude in the feedback loop, or the rate of rise of the signal amplitude, and an optimum value of the phase delay by the phase adjuster is then chosen for a subsequent period of operation.

As the multicarrier-radio transmitter described herein is able to simultaneously produce and amplify signals with an arbitrary spectrum in a radio frequency range that is extended so as to enable transmission of multicarrier signals, some embodiments are able to transmit radio signals according to TETRA, TETRA-2, TEDS, DMR, and/or an analog terrestrial trunked radio system, such as TETRA, TETRA-2 including TEDS, for example. With the multicarrier transmitter described herein it is even possible to uses those different system simultaneously, for example, to transmit TETRA signals in one part of the transmissible spectrum and at the same time analog signals of an analog terrestrial trunked radio system in another part of the transmissible spectrum.

TETRA is a digital terrestrial trunked radio system based on TDMA and FDMA, with a small channel spacing between the available carrier frequencies of only 25 kHz (for example, GSM has a channel spacing of 200 kHz). TETRA is standardized in a series of ETSI EN 300 392 specifications; for example, the air interface of TETRA is standardized in ETSI EN 300 392-2 Version 3.4.1.

TETRA-2 (short-form of TETRA Release 2) is based on TETRA (Release 1) and provides additional functions, such as an extended range for air-ground-air applications, and an improved voice codec. TEDS is an enhanced date service included in TETRA-2 that achieves higher data rates than TETRA by using adaptive modulation schemes and wider channel bandwidths. Four different RF channel bandwidths are provided in TEDS: 25 kHz, 50 kHz, 100 kHz, and 150 kHz, all of which can be used with embodiments of the multicarrier-radio transmitter described herein. TETRA-2 including TEDS has been described in a series of Technical Recommendations by ETSI, designated TR 102 021, and is now standardized in recent Release-2 specifications of the series ETSI TS 100 392, for example ETSI TS 100 392-2 Version 3.5.1 for the air interface.

DMR (Digital Mobile radio) is another standardized terrestrial trunked radio system, for example, described in ETSI TR 102 398 Version 1.1.2. The channel spacing of DMR is only 12.5 kHz.

Analog trunked radio systems are still in use all over the world, with different and often national specifications. An example is MPT 1327 developed in the UK; proprietary analog trunked radio systems are, for example, General Electric EDACS and E F Johnson's Logic Trunked Radio (LTR) systems.

In some embodiments, the multicarrier-radio transmitter has a signal bandwidth sufficient to simultaneously transmit two or more DMR channels with 12.5 kHz bandwidth. In other embodiments, the multicarrier-radio transmitter has a signal bandwidth sufficient to simultaneously transmit two or more TETRA channels with 25 kHz bandwidth. In an exemplary embodiment, the multicarrier-radio transmitter has a signal bandwidth of at least 150 kHz, i.e. a bandwidth sufficient to simultaneously transmit six TETRA channels with 25 kHz, or to support TEDS with the highest bandwidth specified (150 kHz).

Any I/Q (de-)modulator imperfections will generally lead to artifacts in the output signals of the I/Q (de-)modulator concerned. For example, any quadrature error (e.g. due to mismatched I/Q path delay, and/or phase skew of the local-oscillator signals for I and Q) lead to in-band images of the signal, in particular images of the signal mirrored at the frequency of the local-oscillation signal used for the I/Q (de-)modulation. Typically, the impact of such mirror images is little, and is therefore acceptable, if the spectrum of the signal is nearly symmetrical around the local-oscillator frequency, so that operation with symmetric signals is generally desired. However, since in the multicarrier-radio-transmitter circuit described herein no I/Q demodulator or I/Q modulator is located in the reverse path of the feedback loop, but both the I/Q demodulator and the I/Q modulator are rather located in the forward path, any mirror images are suppressed by the effect of the feedback (since no side-image is present in the input signal). Therefore, in some embodiments of the method and use of the transmitter circuit described herein the multicarrier signal produced by the DSP is asymmetric with respect to the local-oscillation-signal frequency used by the I/Q modulator to up-convert the baseband multicarrier signal from baseband to the RF, by only using an asymmetric subset of the available carriers in the multicarrier signal.

Another I/Q modulator imperfection leading to an artifact is local-oscillator feedthrough, which may be caused by a DC voltage offset between the I and Q components, resulting in a spectral component in the output signal at the frequency of the local-oscillation signal used for the I/Q modulation. Typically, the impact of a local-oscillator feedthrough is little if the spectrum of the signal covers the local-oscillator frequency nearly contiguously; i.e. if the local-oscillator frequency is in the middle of two directly adjacent radio channels without any significant gap between the radio channels. Due to the improved artifact suppression by the transmitter circuit described herein, this requirement can be relaxed. Therefore, in some embodiments of the method and use of the transmitter circuit described herein the multicarrier IF signal produced by the DSP is non-contiguous, i.e. the signal only uses a non-contiguous subset of the available carriers in the multicarrier signal.

In some embodiments of the method and use of the transmitter circuit described herein this is combined; i.e. the multicarrier IF signal produced by the DSP is asymmetric and non-contiguous, i.e. the signal only uses a subset of the available carriers in the multicarrier signal that is asymmetric with respect to the local-oscillation-signal frequency used by the I/Q modulator and is non-contiguous.

The ability to transmit non-contiguous and/or asymmetric spectra of that sort enables available frequency channels to be used in a flexible manner. Generally, frequencies are a scarce resource, and it might therefore be a significant limitation for a radio-network operator that needs two or more frequency channels if the transmitter to be used, even if it were suitable for multicarrier transmission, could only operate simultaneously with contiguous frequency channels and/or frequency channels symmetric to a central modulation frequency used in the transmitter. The ability to transmit non-contiguous and/or asymmetric spectra is therefore useful for "frequency economy".

DESCRIPTION OF THE DRAWINGS

Exemplary embodiments are now described with reference to the accompanying drawings, wherein.

The drawings and the description of the drawings are of examples of the invention and are not of the invention itself.

DETAILED DESCRIPTION

Figure 1:
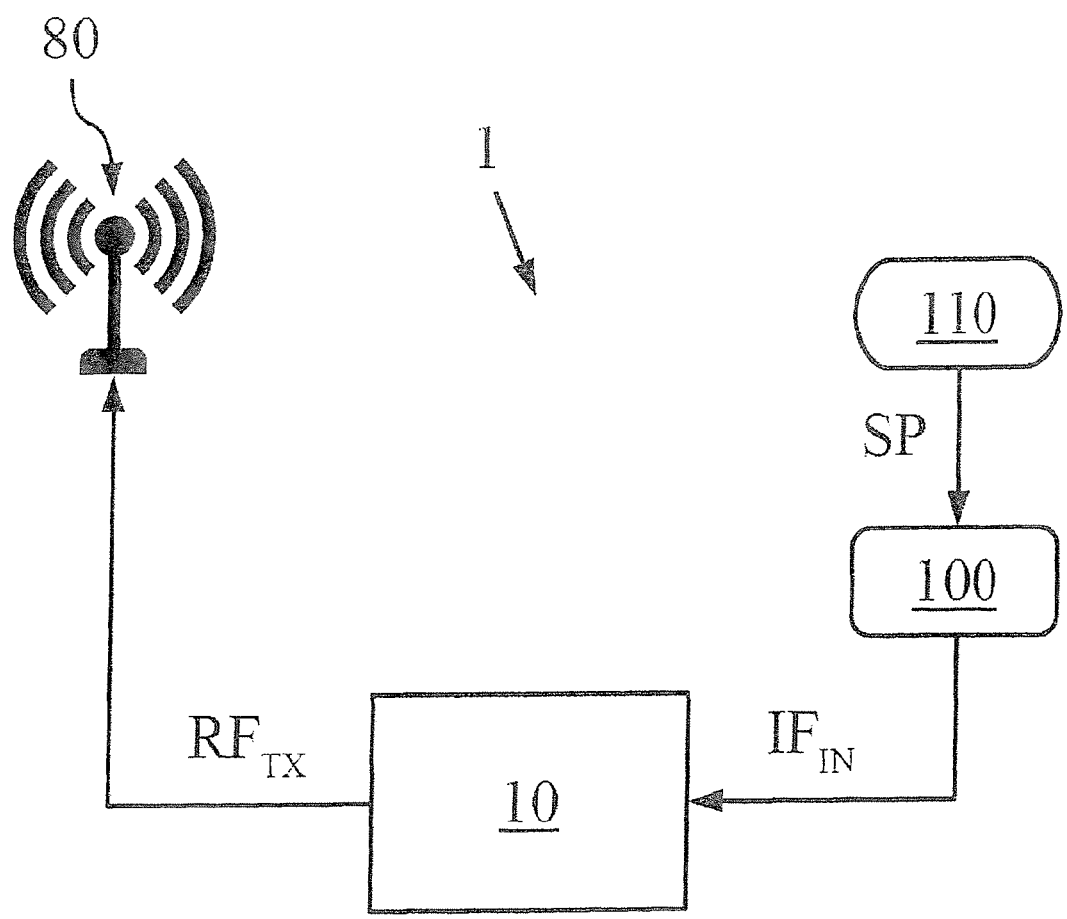
FIG. 1 illustrates an exemplary multicarrier-radio transmitter receiving a data signal, which is converted, amplified and fed to an antenna.

An exemplary multicarrier-radio transmitter 1 with a digital signal processor 100 (also referred to as DSP), which produces a multicarrier IF input signal $IF_{IN}$ from a data signal SP e.g. representing a plurality of communication channels with human speech and/or other payload data, and a transmit amplifier circuit 10 connected to an RF antenna 80 is illustrated in FIG. 1.

Figure 7:
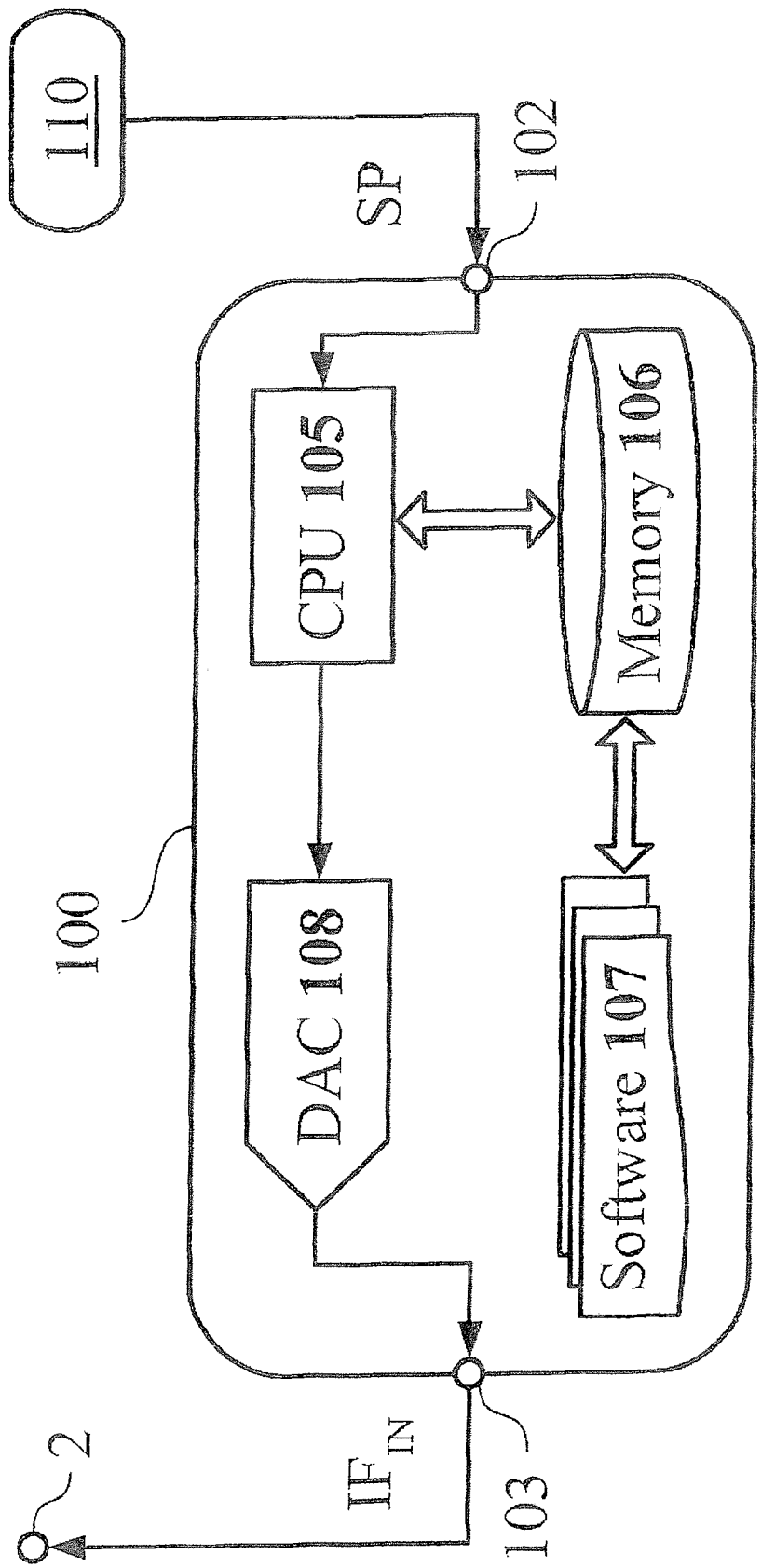
FIG. 7 illustrates an exemplary digital signal processor.

The multicarrier-radio transmitter 1 of FIG. 1 may be part of a base station of a mobile-radio system serving a plurality of mobile terminals simultaneously. The multicarrier-radio transmitter 1 of the base station receives a plurality of signals, for example signals representing speech and/or other payload data signals, collectively referred to as "SP" as an input to the digital signal processor 100. Upon receipt of the signal SP at the DSP 100 a CPU 105 of the DSP 100 generates a digital multicarrier signal that is converted to the analog $IF_{IN}$ by a digital-to-analog converter (DAC) 108. The $IF_{IN}$ is output by the DSP 100, as is shown in FIG. 7 in more detail, to a transmit amplifier circuit 10 connected to an RF antenna 80.

Figure 3:
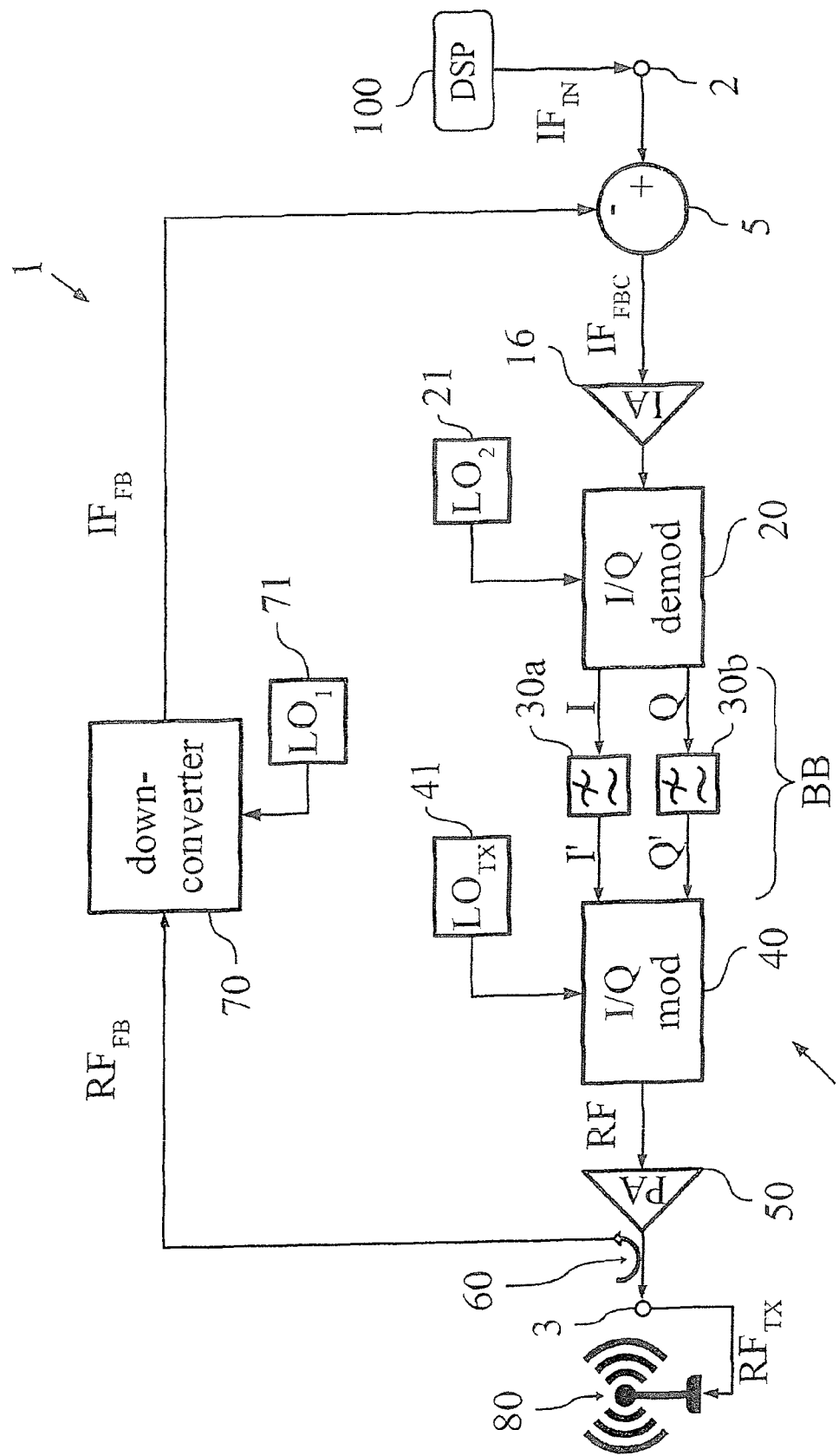
FIG. 3 illustrates the multicarrier-radio transmitter of FIG. 1 with a more detailed representation of the transmit amplifier circuit.
Figure 4:
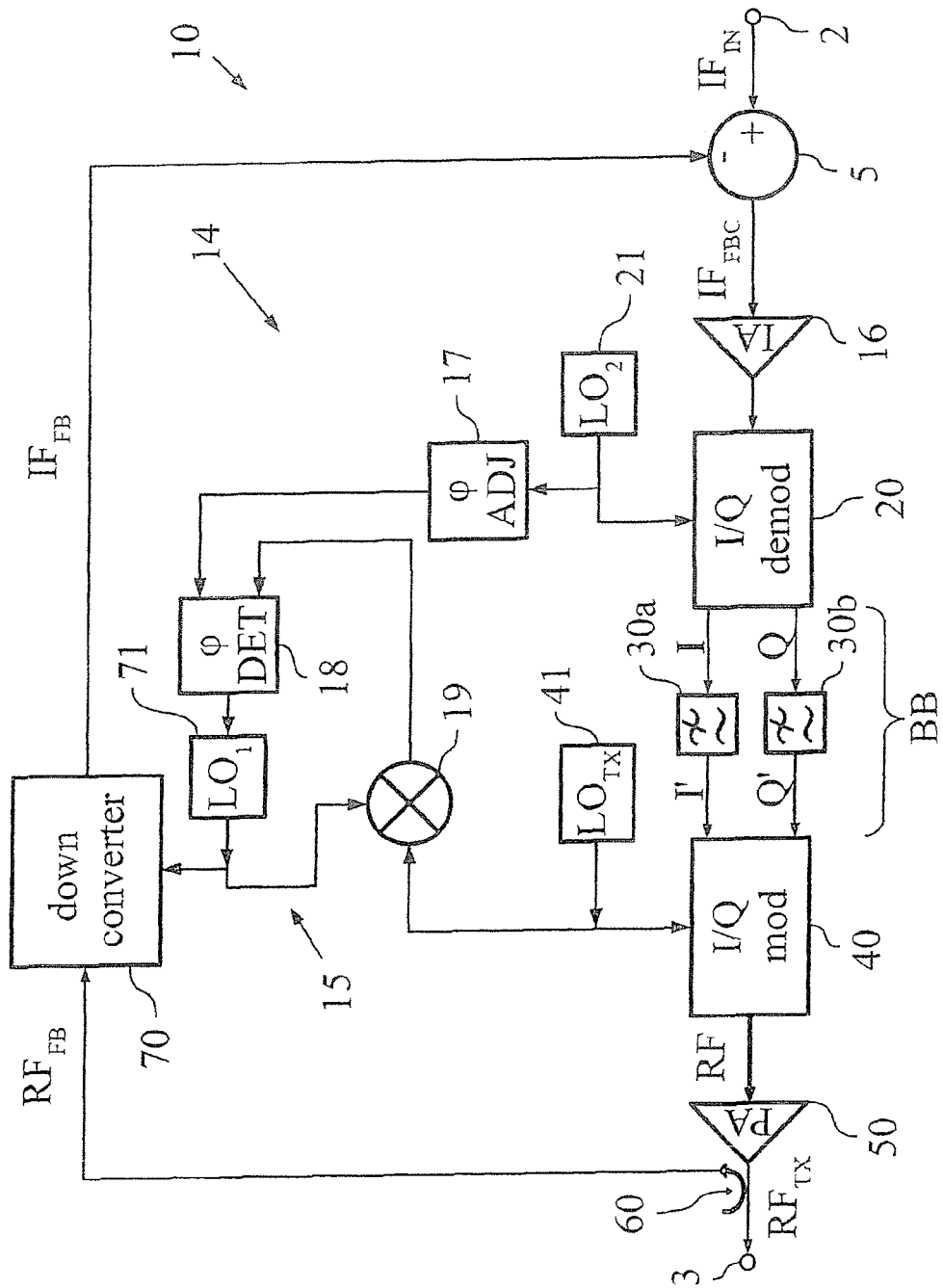
FIG. 4 illustrates an exemplary local-oscillator network for the transmit amplifier circuit of FIG. 3.

The transmit amplifier circuit 10 converts the multicarrier IF input signal $IF_{IN}$ to a multicarrier RF output signal $RF_{TX}$ suitable for transmittance via the RF antenna 80. The transmit amplifier circuit 10 has an input 2 and an output 3 and is formed by a feedback loop 11 between the input 2 and the output 3 as shown in FIGS. 2 to 4.

The incoming multicarrier signal is amplified in the transmit amplifier circuit 10 by a power amplifier 50, which is linearized by the feedback loop 11. The amplified multicarrier signal $RF_{TX}$ is fed to the RF antenna 80 for transmittance, for example, over a radio network.

Figure 2:
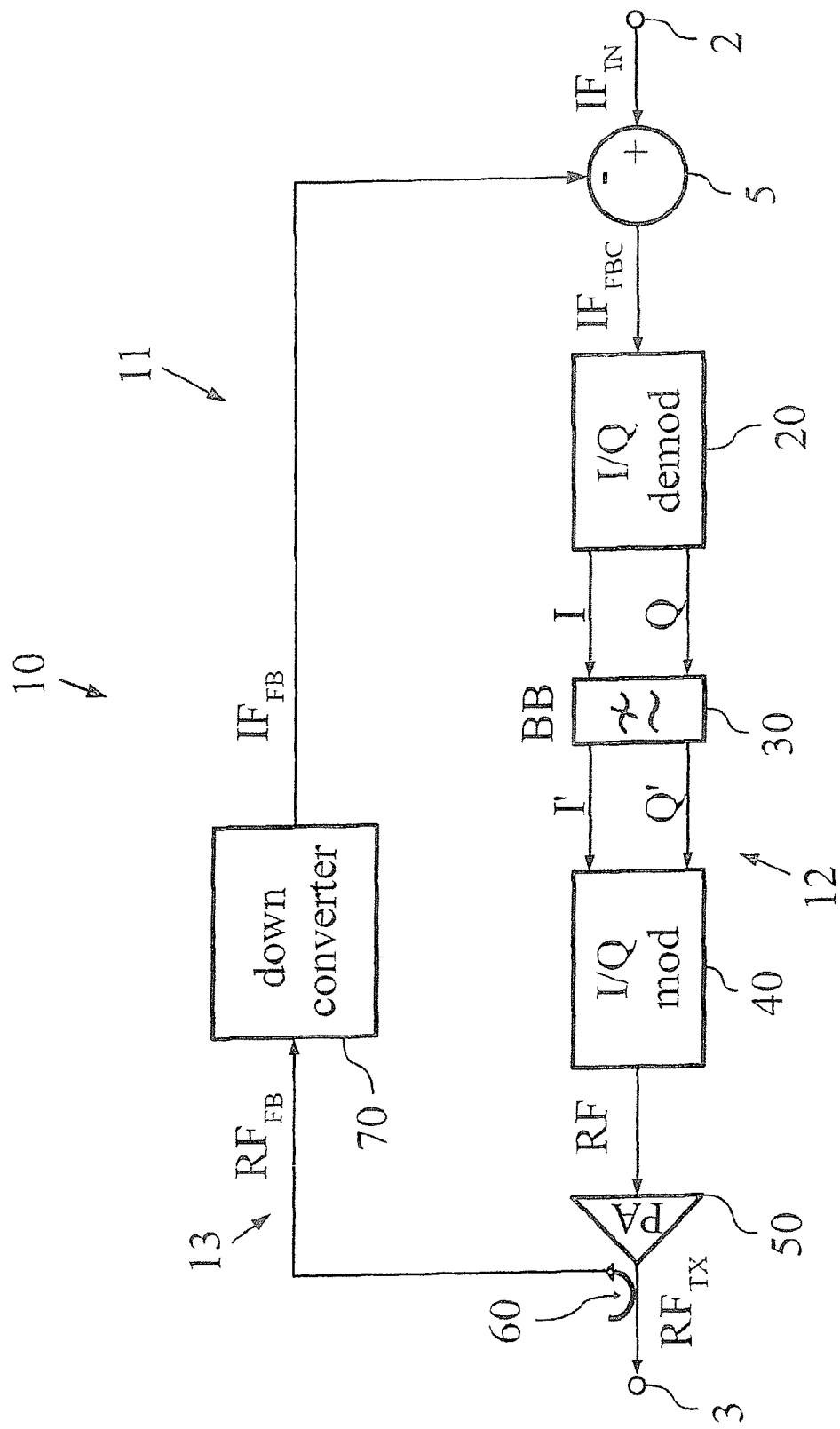
FIG. 2 illustrates a transmit amplifier circuit of the exemplary multicarrier-radio transmitter of FIG. 1 in more detail.

According to FIG. 2 the feedback loop 11 of the transmit amplifier circuit 10 has a forward path 12 and a reverse path 13. A subtractor 5 and a pick-off node 60 constitute the two elements where the forward path 12 and the reverse path 13 are connected to each other to form the feedback loop 11.

The multicarrier IF input signal $IF_{IN}$ from the digital signal processor 100 enters the feedback loop 11 by an input of the subtractor 5. The subtractor 5 generates an error signal that represents the difference between the $IF_{IN}$ and a feedback signal applied to another input of the subtractor 5. The error signal is also referred to as a feedback-corrected multicarrier signal $IF_{FBC}$ that exits an output of the subtractor 5.

In some examples an input amplifier 16, which may then be arranged in the forward path 12 (see FIGS. 3, 4) amplifies the $IF_{FBC}$ to condition the signal strength to the subsequent elements.

Further in the forward path 12 an I/Q demodulator 20 for down-converting the $IF_{FBC}$ from IF to baseband (also referred to as "BB) is provided. By this down-conversion the feedback-corrected multicarrier IF input signal is also split into an in-phase component I and a quadrature component Q.

Following the I/Q demodulator 20 in the forward path 12 a loop-filter system 30 at baseband with low-pass characteristic provides stability to the feedback loop 11. The loop-filter system 30 may be comprised of two loop filters 30a, 30b for the I component and the Q component, respectively (see FIGS. 3 and 4). Thus, the I component and the Q component are low-pass filtered by loop filters 30a and 30b, respectively. The cut-off frequency of the loop filters 30a and 30b may be chosen such that the loop filters 30a, 30b filter out the frequencies with a phase shift close to 180° with regard to the baseband signal so that the loop gain for those frequencies is less than unity. Hence, frequencies at "counter-phase" (i.e. signals with a phase shift at around 180°) are effectively attenuated so that the feedback loop 11 is stable.

After the filtering by the loop filters 30a and 30b, the filtered multicarrier baseband signal I', Q' is up-converted from baseband to RF by an I/Q modulator 40. The up-conversion by the I/Q modulator 40 includes the combination of the I' and Q' components into the common multicarrier RF signal (denoted "RF" in FIG. 2).

The multicarrier RF signal is subsequently amplified by a power amplifier 50. The power amplifier 50 may be a single-step amplifier or may be comprised of a plurality of amplifiers in series. The amplified multicarrier RF signal (also referred to as $RF_{TX}$) is output at an antenna connector, also referred to as "output 3" and thereby fed to an RF antenna 80 (FIGS. 1 and 3) for transmittance over the air interface of the radio network.

The $RF_{TX}$ is picked-off by the pick-off node 60 between the power amplifier 50 and the output 3. By way of the pick-off node 60 a feedback signal at the RF corresponding to $RF_{TX}$ is branched off from the amplified multicarrier RF signal $RF_{TX}$ so as to obtain a fed-back signal at the RF (also referred to as $RF_{FB}$). This is the starting point of the reverse path 13.

The fed-back multicarrier RF signal $RF_{FB}$ is down-converted in the reverse path 13 to IF by a down converter 70, thereby producing a fed-back multicarrier signal at the IF (also referred to as $IF_{FB}$).

The fed-back multicarrier IF signal $IF_{FB}$ is fed to an input of the subtractor 5, where it is subtracted from the multicarrier IF input signal $IF_{IN}$ that is fed into another input of the subtractor 5, as described above. Hence, the subtractor 5 is at the end point of the reverse path 13.

Alternatively, the subtractor 5 can be implemented as a summer that adds an inverted version of the fed-back multicarrier IF signal $IF_{FB}$.

FIG. 3 again shows the complete multicarrier-radio transmitter 1 including the DSP 100 and the transmit amplifier circuit 10, as in FIG. 1. The loop-filter system 30 is presented in more detail in the form of two separate low-pass loop filters 30a, 30b for the I and Q components, respectively, as already explained above. In addition, FIG. 3 introduces various local oscillators.

A local oscillator 21, also designated $LO_2$, provides a local-oscillation signal to the I/Q demodulator 20 to down-convert the $IF_{FBC}$. The local-oscillation signal produced by the local oscillator 21, $LO_2$, has a frequency corresponding to the IF.

A local oscillator 41, also designated $LO_{TX}$, provides a local-oscillation signal to the I/Q modulator 40 to up-convert the filtered components I' and Q' of the multicarrier baseband signal from BB to RF. The local-oscillation signal produced by the local oscillator 41, $LO_{TX}$, has a frequency corresponding to the RF.

A local oscillator 71, also designated $LO_1$, provides a local-oscillation signal to the down converter 70 to down-convert the $RF_{FB}$ from the RF to the IF. The local-oscillation signal produced by the oscillator 71, $LO_1$, has a frequency corresponding, for example, to the sum or the difference of the RF and the IF.

FIG. 4 illustrates an exemplary local-oscillator network 14 to coordinate the $LO_1$, $LO_2$, and $LO_{TX}$ so that the total effect of the stepwise down-conversion from RF to IF and from IF to baseband should be complementary to that of the single-step up-conversion from baseband to RF. Put differently, the local-oscillators, although all produce local-oscillation signals with different frequencies, are correlated such that they produce their local-oscillation signals in a manner that the frequencies and phases of the local-oscillation signals are matched to properly combine the fed-back multicarrier IF signal $IF_{FB}$ with the multicarrier IF input signal $IF_{IN}$ from the DSP 100, i.e. by eliminating IF frequency offset and phase shift at the inputs of the subtractor 5.

For this purpose the local oscillator $LO_1$ is frequency and phase controlled relative to the other local oscillators $LO_2$, and $LO_{TX}$, that are free-running, to ensure that the sum or the difference of the frequencies of the local-oscillation signals for the down converter 70 and the local-oscillation signal for the I/Q demodulator 20 equals the frequency of the local-oscillation signal for the I/Q modulator 40.

The local oscillator $LO_1$ is frequency- and phase-controlled by an output signal of a phase-locked loop 15 in the local-oscillator network 14. The phase-locked loop 15 comprises a phase determiner 18 that produces, for example, an output voltage that controls the local oscillator $LO_1$. The local-oscillation signal produced by the local oscillator $LO_1$ is fed back to the phase determiner 18 via an oscillation-signal mixer 19. The oscillation-signal mixer 19 mixes the local-oscillation signals from the local oscillator $LO_1$ and the local oscillator $LO_{TX}$ so as to produce an instance of an intermediate frequency related to the two local-oscillation signals mixed. This produces the feedback signal of the phase-locked loop 15, also referred to as "PLL feedback signal". Hence, the feedback loop of the phase-locked loop 15 also comprises the local oscillator $LO_1$ and the mixer 19 that mixes the oscillation signal for I/Q modulator 40 produced by the local oscillator $LO_{RX}$ into the feedback loop of the phase-locked loop 15.

The signal produced by the oscillation-signal mixer 19 contains a difference signal of the local oscillation signal produced by the local oscillator $LO_1$ and the local oscillation signal produced by the local oscillator $LO_{TX}$, which is the instance of an intermediate frequency mentioned above. The frequency- and phase-control for the local oscillator $LO_1$ also ensures that the relative phase between this signal, that is an instance of an intermediate frequency, and the local-oscillation signal from the local oscillator $LO_2$ is constant.

The phase-locked loop 15 receives, as a control-input signal, a signal representative of the local-oscillation signal of the local oscillator $LO_2$ associated with the I/Q demodulator 20. On the basis of any deviation in the frequency and/or phase between the control-input signal and the PLL feedback signal the phase-locked loop 15 produces a control signal for the frequency- and phase-controlled oscillator $LO_1$. If the frequencies of the control-input signal and the PLL feedback signal are not the same, the control signal will increase (or decrease) in time, and if the frequencies of the control-input signal and the PLL feedback signal are the same, but the control-input signal and the PLL feedback signal being phase shifted by a value constant in time, the control signal will take a constant value representative of the phase shift. In response to this control signal the frequency- and phase-controlled oscillator $LO_1$ adjusts the frequency and phase of the local-oscillation signal produced by it so that the frequency and the relative phase of the control-input signal and the PLL feedback signal become identical and zero, respectively.

As explained above, the oscillation-signal mixer 19 of the PLL 15 produces a frequency-converted version of the local-oscillation signal of the controlled local oscillator $LO_1$. It mixes the local-oscillation signals from the local oscillator $LO_1$ and the local oscillator $LO_{TX}$ so as to produce an instance of an intermediate frequency related to the two local-oscillation signals mixed. As usual the oscillation-signal mixer 19 will produce two frequencies, corresponding to the sum and the (absolute value of) the difference of the two frequencies mixed. The difference of the two signals mixed can be used as the PLL feedback signal. If the oscillation frequency of the local oscillator $LO_1$ is chosen to be the difference or the sum of RF and IF then the difference of the two frequencies mixed is an instance of an intermediate frequency (because RF−(RF−ZF)=ZF, and (RF+ZF)−RF=ZF).

A phase adjuster 17 is provided in the local-oscillator network 14 to adjust the phase of the local-oscillation signal, in this example, of the local oscillator $LO_2$, that forms the control-input signal to the phase-locked loop 15, e.g. by introducing a phase shift φ. The phase adjuster 17 is therefore inserted between the local oscillator $LO_2$ and the phase determiner 18 that compares the control-input signal and the PLL feedback signal of the phase-locked loop 15 to control the local oscillator $LO_1$. As the phase-locked loop 15 ensures that the relative phase of the control-input signal and the PLL feedback signal becomes zero, any desired constant relative phase between the signals (a) and (b) can be adjusted by means of the phase adjuster 17, wherein the signal (a) is the frequency-converted combination of the oscillation signal from the local oscillator $LO_{TX}$ and that from the controlled local oscillator LO$_1$ (e.g. the difference signal produced by the oscillation-signal mixer 19 mentioned above), and the signal (b) is the local oscillation signal produced by LO$_2$. By allowing the phase of the local-oscillation signal produced by LO$_2$ to be adjusted, the phase adjuster 17 enables signal-propagation delays in the feedback loop 11 of the transmit amplifier circuit 10 to be compensated at the level of the IF, so that the region of instability (at around 180° phase shift in the IF signal) is also avoided at the IF level.

Figure 5:
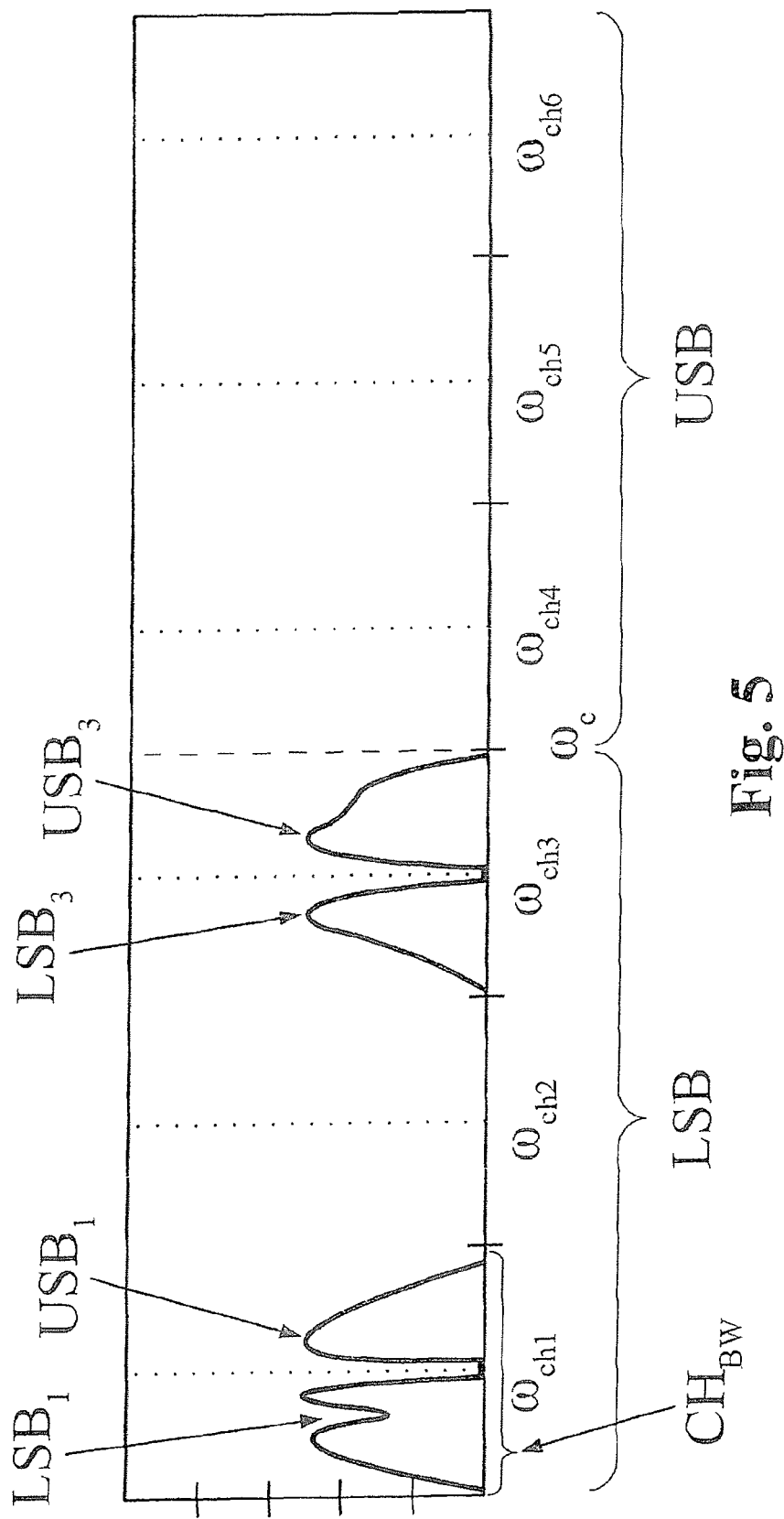
FIG. 5 illustrates a spectrum of a multicarrier RF signal without artifacts.

An example of a spectrum of a multicarrier signal that can be produced, amplified and transmitted with the examples of the multicarrier-radio transmitter 1 is illustrated in FIG. 5. In this example, the frequency range in which the multicarrier-radio transmitter 1 can simultaneously transmit I/Q-modulated signals extends over six frequency channels, or carriers $\omega_{ch1}$ to $\omega_{ch6}$, of a given radio system, such as TETRA, TETRA-2, DMR; each having a channel bandwidth CH$_{BW}$ of 12.5 kHz or 25 kHz, for example. FIG. 5 also illustrates the position of the frequency of the local-oscillation signal for the I/Q modulator 40 in the center of the frequency range in which the multicarrier-radio transmitter 1 can transmit simultaneously with the label $\omega_c$, although this frequency is actually not (or not a significant) part of the spectrum. The parts of the spectrum below and above the center frequency $\omega_c$ are labelled as "LSB" (lower side band) and "USB" (upper side band), respectively. The number "six" of frequency channels, or carriers, is of course only exemplary; in other implementations the number could be any natural number N.

In the instance shown, however, only a subset of the N (for example: six) frequency channels, or carriers, is used, namely a subset of frequency channels/carriers that is not contiguous, and that is not symmetric to the frequency $\omega_c$ of the local-oscillation signal for the I/Q modulator 40 in the center of the frequency range in which the multicarrier-radio transmitter 1 can transmit simultaneously.

Due to the fact that in the multicarrier-radio transmitter 1 there is no I/Q demodulator outside the forward path 12 of the feedback loop 11 (i.e. no I/Q demodulator in the reverse path 13 of the feedback loop 11, and no I/Q modulator before the subtractor 5 where the signal to be transmitted enters the feedback loop 11) any artifacts in the transmitted multicarrier radio signal RF$_{TX}$ are suppressed by the feedback. In particular, there is no significant sideband mirroring and no significant feedthrough of the local-oscillation signal at $\omega_c$ into the transmitted multicarrier RF signal RF$_{TX}$, as shown in FIG. 5.

Figure 6:
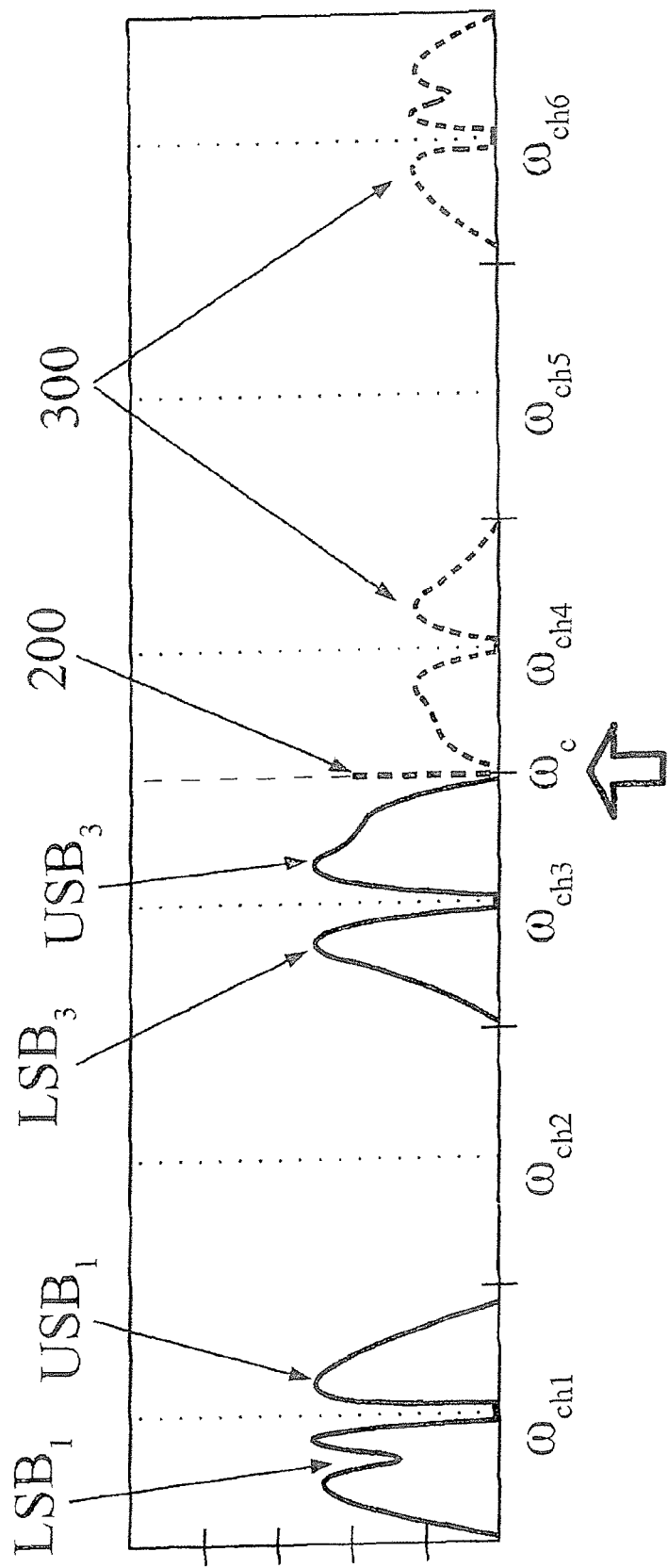
FIG. 6 illustrates a spectrum of a multicarrier RF signal with artifacts that could be produced by a conventional transmit amplifier with Cartesian feedback, i.e. with an I/Q demodulator located in the reverse path of a feedback loop.

This is further explained by FIG. 6, which schematically shows what could happen with a conventional RF transmitter with an I/Q demodulator in the reverse path of the feedback loop ("Cartesian feedback") or an I/Q modulator before the input to the feedback loop.

As shown schematically in FIG. 6, significant artifacts could then occur in the transmitted RF signals; i.e. mirror images 300 of the asymmetrically used frequency channels, mirrored at $\omega_c$ (in the example shown these mirror images are at $\omega_{ch4}$ and $\omega_{ch6}$, and a feedthrough 200 of the local-oscillation signal at $\omega_c$ into the transmitted multicarrier RF signal (the feedthrough 200 and the mirror images 300 are depicted as dashed lines and the mirror axis at $\omega_c$ is marked with an arrow in FIG. 6)). Such artifacts might be acceptable under symmetric and contiguous use of the available frequency channels, because in symmetric use the mirror images 300 would fall onto another channel used by the same transmitter (rather than an alien frequency channel used by another operator), and in non-contiguous and symmetric use (i.e. use centered around the center frequency $\omega_c$) the feedthrough 200 of the I/Q modulator's local oscillator (i.e. the local-oscillation-signal frequency) would fall between two adjacent frequency channels (rather than between, or adjacent to, alien frequency channels used by other operators).

Hence, the suppression of the artifacts shown in FIG. 6 enables available frequency channels to be used in a more flexible way, and is therefore useful for frequency economy.

An exemplary digital signal processor 100 (DSP as an abbreviation) of a multicarrier-radio transmitter 1, which produces a multicarrier IF input signal IF$_{IN}$ for the transmit amplifier circuit 10 from data signals 110 (designated "SP" for speech), e.g. representing a plurality of communication channels with human speech and/or or other payload data, is illustrated in FIG. 7.

The DSP 100 has an input 102 for receiving the data signals 110 and an output 103 for providing the IF$_{IN}$ to the input 2 of the transmit amplifier circuit 10. The DSP 100 has a CPU 105 to encode the received SP onto an IF signal using software 107 stored on memory 106. The memory 106 may be volatile random access memory (RAM) or non-volatile memory, e.g. read-only memory, Electrically Erasable Programmable Read-Only Memory (EEPROM), flash memory, or ferroelectric RAM (F-RAM). Thereby the CPU 105 generates a digital multicarrier IF signal that is converted by a digital-to-analog converter 108 (abbreviated DAC) to the multicarrier IF input signal IF$_{IN}$, which is fed to the input 2 of the transmit amplifier circuit 10.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

It is claimed:

1. A multicarrier-radio transmitter internally using at least three frequency levels, baseband, an intermediate frequency (IF) and a radio frequency (RF) and comprising: a digital signal processor to produce a multicarrier signal at the IF, and a transmit amplifier circuit to amplify and transmit the multicarrier signal at the RF, the transmit amplifier circuit forming a feedback loop comprising a forward path and a reverse path, wherein the multicarrier signal at the IF is an input signal to the transmit amplifier circuit; wherein the feedback loop comprises: a subtractor to receive the multicarrier IF input signal from the digital signal processor and a fed-back signal from the reverse path at the IF and to provide a feedback-corrected signal at the IF; an I/Q demodulator in the forward path to down-convert the feedback-corrected multicarrier signal from the IF to baseband; a loop-filter system in the forward path at baseband; an I/Q modulator in the forward path to up-convert the baseband multicarrier signal from baseband to the RF; a power amplifier in the forward path to amplify the RF signal to be transmitted via an antenna; a pick-off node to pick off the RF multicarrier signal after the power amplifier; a down converter in the reverse path to down-convert the picked-off RF multicarrier signal from the RF to the IF.

2. The multicarrier-radio transmitter according to claim 1, wherein the loop-filter system in the forward path at baseband comprises a loop filter for the I component and a loop filter for the Q component.

3. The multicarrier-radio transmitter according to claim 1, wherein the loop-filter system comprises low-pass filters to ensure that a loop gain is below unity at 180° phase shift.

4. The multicarrier-radio transmitter according to claim 1, wherein the I/Q modulator is performing the up-conversion by means of a local oscillation signal, wherein the local oscillation signal is suppressed in the up-converted multicarrier signal at the RF.

5. The multicarrier-radio transmitter according to claim 1, wherein the I/Q demodulator, the I/Q modulator, and the down converter are performing by means of local oscillation signals,
wherein the local oscillation signal for the I/Q demodulator has a frequency at the IF,
the local oscillation signal for the I/Q modulator has a frequency at the RF,
the local oscillation signal for the down converter has a frequency corresponding to the sum or the difference of the frequency of the local oscillation signal for the I/Q modulator and the frequency of the local oscillation signal for the I/Q demodulator.

6. The multicarrier-radio transmitter according to claim 5, further comprising
local oscillators to produce the local oscillation signals, and
a local-oscillator network connecting the local oscillators, wherein at least one of the local oscillators is frequency and phase controlled relative to the other local oscillator, or oscillators, to ensure that a sum or difference of the frequencies of the local oscillation signal for the down converter and the local oscillation signal for the I/Q demodulator equals the frequency of the local oscillation signal for the I/Q modulator.

7. The multicarrier-radio transmitter according to claim 6, wherein the frequency- and phase-control of at least one of the local oscillators also ensures that a phase of a difference signal of the local oscillation signal for the down converter and the local oscillation signal for the I/Q demodulator relative to a phase of the local oscillation signal for the I/Q modulator is constant.

8. The multicarrier-radio transmitter according to claim 6, wherein there are three local oscillators, and two of the three local oscillators are free-running oscillators, and the third local oscillator is frequency- and phase-controlled by an output signal of a phase-locked loop, wherein the phase-locked loop receives a signal representative of the local-oscillation signal of one of the two local oscillators, and wherein a feedback-signal of the phase-locked loop is a frequency-converted combination of the local-oscillation signal of the other of the two local oscillators and the local-oscillation signal of the frequency- and phase-controlled local oscillator.

9. The multicarrier-radio transmitter according to claim 5, further comprising a phase adjuster to adjust a local-oscillation-signal phase.

10. The multicarrier-radio transmitter according to claim 1, radio signals according to at least one of TETRA, TETRA-2, TEDS, DMR, and an analog trunked radio system.

11. The multicarrier-radio transmitter according to claim 10, having a signal bandwidth sufficient to transmit at least two DMR channels with 12.5 kHz bandwidth, or at least two TETRA channels with 25 kHz bandwidth.

12. A method of generating amplified multicarrier-radio signals with a multicarrier-radio transmitter internally using at least three frequency levels, baseband, an intermediate frequency (IF) and a radio frequency (RF); and comprising a feedback loop with a forward path and a reverse path, the method comprising: producing the multicarrier signal at the IF by a digital signal processor, receiving, at a subtractor, the multicarrier IF input signal and a fed-back IF signal from the reverse path to provide a feedback-corrected multicarrier signal at the IF; down-converting, in the forward path, the feedback-corrected multicarrier signal from the IF to baseband by an I/Q demodulator; filtering, in the forward path, the multicarrier signal at baseband by a loop-filter system; up-converting, in the forward path, the baseband multicarrier signal from baseband to the RF by an I/Q modulator; amplifying by a power amplifier, in the forward path, the RF signal to be transmitted via an antenna; picking off, by a pick-off node, the RF multicarrier signal after the power amplifier; down-converting the picked-off RF multicarrier signal from the RF down to the IF by a down converter in the reverse path.

13. The method of claim 12, wherein in the multicarrier signal produced by the digital signal processor, which is input into the subtractor, uses only a sub-set of carriers including at least two non-contiguous carriers, or a sub-set of carriers, that is asymmetric with respect to an RF-modulation carrier frequency used by the I/Q modulator to up-convert the baseband multicarrier signal from baseband to the RF.

14. The method of claim 12,
wherein the I/Q modulator is performing the up-conversion by means of a local oscillation signal, wherein the local oscillation signal is suppressed in the up-converted multicarrier signal at the RF.

15. The method of claim 12,
wherein the I/Q demodulator, the I/Q modulator, and the down converter perform conversions by means of local oscillation signals,
wherein the local oscillation signal for the I/Q demodulator has a frequency at the IF,
the local oscillation signal for the I/Q modulator has a frequency at the RF, and
the local oscillation signal for the down converter has a frequency corresponding to the sum or the difference of the frequency of the local oscillation signal for the I/Q modulator and the frequency of the local oscillation signal for the I/Q demodulator.

16. The method of claim 15,
wherein a sum or difference of the frequencies of the local oscillation signal for the down converter and the local oscillation signal for the I/Q demodulator equals the frequency of the local oscillation signal for the I/Q modulator.

17. The method of claim 16,
wherein a phase of a difference signal of the local oscillation signal for the down converter and the local oscillation signal for the I/Q demodulator relative to a phase of the local oscillation signal for the I/Q modulator is constant.

18. The method of claim 12,
wherein the multicarrier-radio transmitter transmits radio signals according to at least one of TETRA, TETRA-2, TEDS, DMR, and an analog trunked radio system.

19. The method of claim 18,
wherein the multicarrier-radio transmitter has a signal bandwidth sufficient to transmit at least two DMR channels with 12.5 kHz bandwidth, or at least two TETRA channels with 25 kHz bandwidth.

* * * * *